(12) United States Patent
Masuda et al.

(10) Patent No.: US 10,130,914 B2
(45) Date of Patent: Nov. 20, 2018

(54) PLEAT CARTRIDGE FILTER

(71) Applicants: JNC Corporation, Tokyo (JP); JNC Filter Co., Ltd., Osaka-shi, Osaka (JP)

(72) Inventors: Yoshiichi Masuda, Moriyama (JP); Takumi Kojima, Moriyama (JP); Osamu Yamaguchi, Moriyama (JP)

(73) Assignees: JNC Corporation, Tokyo (JP); JNC Filter Co., Ltd., Osaka (JP)

( * ) Notice: Subject to any disclaimer, the term of this patent is extended or adjusted under 35 U.S.C. 154(b) by 0 days.

(21) Appl. No.: 15/457,125

(22) Filed: Mar. 13, 2017

(65) Prior Publication Data

US 2017/0312693 A1    Nov. 2, 2017

(30) Foreign Application Priority Data

Mar. 11, 2016   (JP) ................. 2016-048670

(51) Int. Cl.
| | | |
|---|---|---|
| *B01D 39/00* | (2006.01) | |
| *B01D 63/06* | (2006.01) | |
| *B01D 71/26* | (2006.01) | |
| *B01D 71/36* | (2006.01) | |
| B32B 27/00 | (2006.01) | |

(52) U.S. Cl.
CPC .......... *B01D 63/067* (2013.01); *B01D 71/26* (2013.01); *B01D 71/36* (2013.01); *B01D 2313/44* (2013.01)

(58) Field of Classification Search
CPC ........ B01D 39/00; B01D 39/02; B01D 39/04; B01D 39/08; B01D 39/083; B32B 27/02; B32B 27/327

USPC .......... 210/500.1, 500.21, 500.27, 503, 505; 428/113, 304.4
See application file for complete search history.

(56) References Cited

U.S. PATENT DOCUMENTS

| | | | | |
|---|---|---|---|---|
| 5,855,784 | A * | 1/1999 | Pike ..................... | B01D 39/163 210/503 |
| 5,980,759 | A * | 11/1999 | Proulx .................. | B01D 29/21 210/321.86 |
| 2003/0000874 | A1* | 1/2003 | Proulx ................. | B01D 63/061 210/85 |
| 2008/0245041 | A1* | 10/2008 | Choi .................... | B01D 39/163 55/524 |

(Continued)

FOREIGN PATENT DOCUMENTS

| | | |
|---|---|---|
| JP | 2000-317280 A | 11/2000 |
| JP | 2008-179799 A | 8/2008 |

OTHER PUBLICATIONS

Peacock, A., Handbook of Polyethylene: Structures: Properties, and Applications, 2000, CRC Press, 1 page.

(Continued)

*Primary Examiner* — Allison G Fitzsimmons
(74) *Attorney, Agent, or Firm* — Hodgson Russ LLP

(57) ABSTRACT

There is provided a pleated cartridge filter for high-purity chemicals that minimizes elution of metal from polyethylene into high-purity chemicals and is suitable mainly for a resist manufacturing process. A cylindrical pleated cartridge filter including a cylindrical core, a pleated filter material wound on the core, and caps sealing both ends of the core, wherein the pleated filter material is composed of a filtration membrane and a spacer laminated together, and the spacer is a nonwoven fabric made of polyethylene fibers having a metal element content of less than 40 ppm.

9 Claims, 1 Drawing Sheet

(56) References Cited

U.S. PATENT DOCUMENTS

2012/0061314 A1* 3/2012 Choi ................ B01D 67/0088
210/490

OTHER PUBLICATIONS

Musoke, L., et al., The Migration of Chemical Contaminants from Polyethylene Bags into Food During Cooking, The Open Food Science Journal, 2015, vol. 9, pp. 14-18.

* cited by examiner

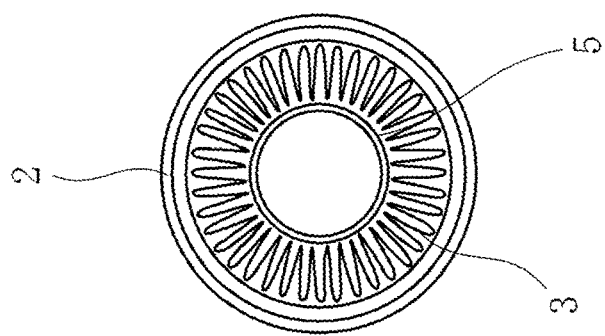
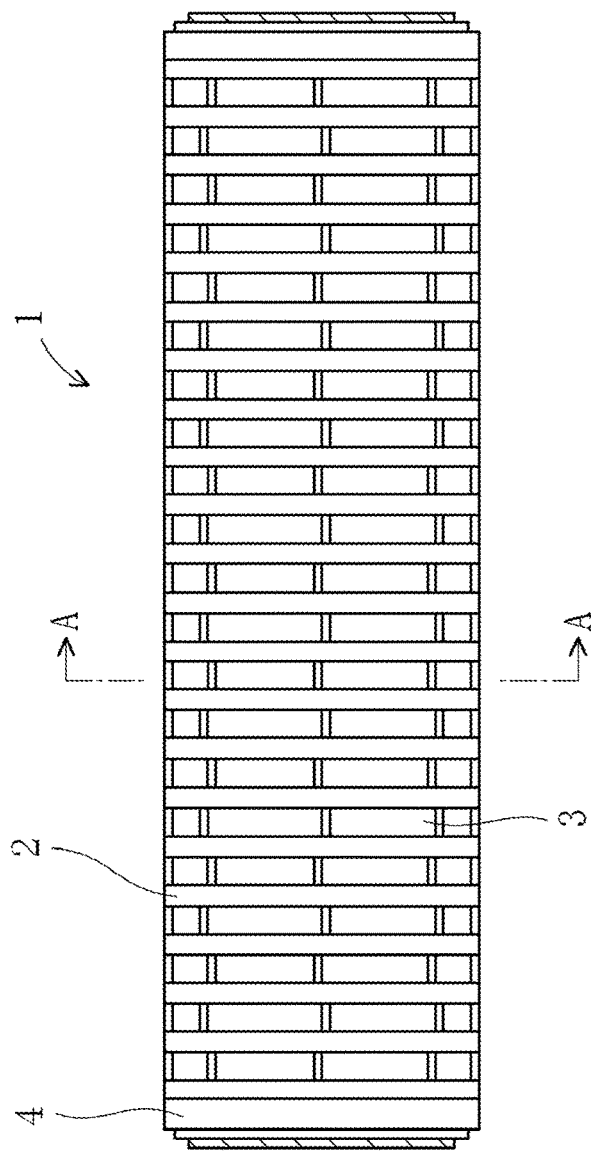

PLEAT CARTRIDGE FILTER

TECHNICAL FIELD

The present invention relates to a pleated cartridge filter for high-purity chemicals.

BACKGROUND ART

Next-generation technical innovation in a semiconductor industry is progressing. When a semiconductor pattern is fabricated, a KrF excimer laser with a wavelength of 248 nanometers, furthermore, a liquid-immersion ArF excimer laser with a wavelength of 193 nanometers or the like is currently used. However, in aiming at achieving further finer lines, study has been made on processing with a target line width of 7 nanometers by utilizing extreme ultraviolet lithography for a wavelength of 13.5 nanometers.

When such a fine pattern is fabricated, mixing of only a limited amount of particles or metal ions in a working environment causes defects, and therefore a resist liquid to be used or the like is filtered by using a filter with a significantly small pore diameter such as several nanometers to several tens of nanometers in pore diameter in many cases. In such a filter, a filter made of polymer is used in order to prevent elution of metal ions in many cases.

As a raw material of such a filter, polypropylene has so far been used because of chemical stability and easiness of thermal processing. However, polypropylene has a disadvantage of being easily oxidatively decomposed, and therefore only a limited amount of fine particles produced by oxidative decomposition may be occasionally mixed into a filtrate, or an antioxidant added to polypropylene for preventing the oxidative decomposition may be occasionally mixed into the filtrate. In order to improve the above problem, polyethylene that is by far scarcely oxidizable than polypropylene has been frequently used.

Polyethylene is superior to polypropylene in view of difficulty in being oxidatively decomposed, but several hundred ppm of metal-containing substance is kneaded in the form of residues of a polymerization catalyst or a gel inhibitor in many cases. Such a metal-containing substance is ordinarily rarely eluted from polyethylene. However, if polyethylene is exposed into a liquid having high solubility, such as the resist liquid for a long period of time, but polyethylene is eluted little by little. Only a limited amount of the metal-containing substance has been known to cause the defect, particularly in a step in which processing is made at a short wavelength.

In JP-A-2008-179799, it is disclosed to use a polyethylene for high-purity chemical liquids produced using a Ziegler catalyst by a multistage polymerization method using specific components in order to reduce eluted components, the polyethylene having an effect to prevent the surface of a container from being roughened to increase in surface area. However, a filter cartridge made of a synthetic resin necessarily has an increased surface area due to use of a minute membrane or fibers as a raw material, and it was impossible to sufficiently suppress eluted components even if applying such measures.

JP-A-2000-317280 discloses an example of a pleated cartridge filter for the purpose of reducing eluted components. However, this document has no disclosure regarding a supporting material (spacer) that is essential for the preparation of a filter cartridge and has no investigation about a supporting material.

SUMMARY OF THE INVENTION

Thus, an object of the present invention is to provide a pleated cartridge filter for high-purity chemicals that minimizes elution of metal from polyethylene into high-purity chemicals and is suitable mainly for a resist manufacturing process.

The present inventors repeated intense study in order to solve the above-described problems. As a result, they found that the use of a nonwoven fabric made of polyethylene conjugated fibers whose metal element content is less than 40 ppm as supporting materials (spacers) of a pleated cartridge filter can afford a cartridge filter suited to the purposes, and thus, they have accomplished the present invention based on the finding.

In the present specification, that the metal element content is less than 40 ppm is defined as follows. Specifically, it means that the total of the contents of metal elements of Na, K, Ca, Fe, Cu, Mg, Mn, Li, Al, Cr, Ni and Zn relative to the mass of a nonwoven fabric made of polyethylene conjugated fibers is less than 40 ppm, wherein the metal elements are detected when the nonwoven fabric is analyzed directly with an analyzer or when 0.3 g of a sample is taken from the nonwoven fabric, then nitric acid and hydrochloric acid are added thereto, then microwave decomposition is performed, then the resultant is diluted with ultrapure water to 90 g, and then eluted components extracted under conditions for ICP-MS analysis and ICP-AES analysis are analyzed with an analyzer.

The configurations of the present invention are as follows.

[1] A cylindrical pleated cartridge filter comprising a cylindrical core, a pleated filter material wound on the core, and caps sealing both ends of the core, wherein the pleated filter material is composed of a filtration membrane and a spacer laminated together, and the spacer is a nonwoven fabric made of polyethylene fibers having a metal element content of less than 40 ppm.

[2] The pleated cartridge filter according to [1], wherein the core and the caps are made of polyethylene.

[3] The pleated cartridge filter according to [1] or [2], wherein the filtration membrane is a PTFE membrane or an ultrahigh molecular weight polyethylene membrane.

[4] The pleated cartridge filter according to any one of [1] to [3], wherein the polyethylene fibers are conjugated fibers.

[5] The pleated cartridge filter according to any one of [1] to [4] housed in a cylindrical housing cage.

The pleated cartridge filter for high-purity chemicals of the present invention merely allows elution of an extremely small amount of pollutants such as materials eluted from the polyethylene constituting the filter. Thus, the pleated cartridge filter of the present invention can preferably be used for a photoresist manufacturing process and a semiconductor manufacturing process.

BRIEF DESCRIPTION OF THE DRAWING

FIG. 1 is a schematic view illustrating a side view and a cross section of a pleated cartridge filter that is one example of the present invention.

DETAILED EXPLANATION OF THE PREFERRED EMBODIMENTS

The pleated cartridge filter of the present invention is a cylindrical pleated cartridge filter. The cylindrical pleated cartridge filter has a structure in which a filter material having a pleated shape with repeated hill folds and valley folds formed by pleating is wound on the periphery of a cylindrical core so that the ridgeline direction of the filter material may match the axial direction of the filter, the axial edges of the filter material are joined together to render the filter material continuous, and caps are attached to and seal both ends of the core.

FIG. 1 includes a side view (left figure) of a pleated cartridge filter 1 that is one example of the present invention, and a cross-sectional view (right figure) taken along line A-A. To the outermost layer of the pleated cartridge filter 1 is attached a lattice-like housing cage 2, which protects a pleated filter material 3 installed therein. The pleated cartridge filter 1 is equipped at its both ends with caps 4. The filter material 3 is wound on a core 5, and the core 5 is internally hollow. When the pleated cartridge filter 1 is used, the liquid being filtered passes through the filter from the outside to the interior thereof. The pleated filter material 3 has a configuration in which a laminate composed of a filtration membrane and a spacer is pleated though this is not shown in the figure.

In the present specification, the outer diameter of a pleated cartridge filter refers to the diameter of a virtual circle connecting the tops of the hills of the pleat in a transverse cross section of the filter. The hill height of a pleat refers to ½ of the difference in diameter between a virtual circle connecting the tops of the hills of the pleat and a virtual circle connecting the lowermost parts of the valleys of the pleat.

In the present invention, the outside diameter of the filter is preferably 50 to 120 mm, more preferably 60 to 100 mm, and particularly preferably 65 to 90 mm. If the outer diameter is within the range of 50 to 120 mm, an effect commensurate with the effort for processing can be attained more as compared with non-pleated filter materials. It is particularly preferred that the outer diameter be within the range of 60 to 100 mm because the filter can be used as a standard filter of conventional filtration equipment.

The number of hills of the filter material of the pleated cartridge filter of the present invention can be chosen appropriately according to the diameter of the cylindrical core, the desired filtration area, the thickness of the filter material, etc.; for example, when the diameter of the cylindrical core is 40 to 50 mm and the thickness of the filter material is about 1 mm, it is preferred to configure the filter material so that 90 to 150 hills may be aligned on a circle. Adjusting this value to 90 or more makes it possible to secure the area of a filtration membrane sufficiently. If that value is adjusted to 150 or less, hills of the filter are not close too much, and thus, clogging of the filter by particles can be inhibited.

The filter material used in the present invention is a laminate composed of a filtration membrane and a spacer. As the filtration membrane, preferred is one having a metal content that is as small as possible and being good in filtration performance, and a PTFE membrane or an ultrahigh molecular weight polyethylene membrane can be used. Using a PTFE membrane can afford a cartridge filter having a higher flow rate with a given filtration area. Using an ultrahigh molecular weight polyethylene membrane can afford a cartridge filter having stable filtration performance that is not mostly changed in pore size even under various conditions.

As the filtration membrane, it is preferred to use a filtration membrane made of a material having a metal content of less than 40 ppm. It is common to produce such a membrane by kneading a powder of a feed resin, an oil, etc., spreading the mixture, and then extracting the oil. Filtration membranes characterized by containing metal in a small content are sold in the market, and such membranes can be used. Specific examples include a PTFE membrane or an ultrahigh molecular weight polyethylene membrane having a metal content of less than 40 ppm.

As the ultrahigh molecular weight polyethylene membrane, a nonwoven fabric made of polyethylene ultrafine fibers can also be used. As a microporous membrane made of polyethylene, "MIRAIM" commercially available from TEIJIN LIMITED can be used, for example. As the nonwoven fabric made of polyethylene ultrafine fibers, there can be utilized a nonwoven fabric made of ultrafine fibers having a fiber diameter of 0.1 to 20 µm, and the fiber diameter is preferably 0.5 to 2 µm, more preferably 0.8 to 1 µm.

The nonwoven fabric made of polyethylene ultrafine fibers which constitutes the filtration membrane may be constituted of splittable conjugated fibers, or may be constituted of a melt-blown nonwoven fabric, or may be constituted of fibers obtainable by electrospinning. Preferably, such ultrafine fibers are heat-fused at their intersections.

As the nonwoven fabric made of polyethylene ultrafine fibers, one or a combination of two or more selected from the group consisting of entangled staple fibers, melt-blown nonwoven fabrics, and spunbond nonwoven fabrics can be used. Any type of nonwoven fabric can be produced in accordance with a conventional method. Preferably, the filtration membrane is formed of a single sheet or a plurality of sheets stacked of such nonwoven fabric. Although the number of sheets stacked may be chosen appropriately according to the thickness of the entangled staple fibers, melt-blown nonwoven fabric, or spunbond nonwoven fabric to be used, and the thickness of the spacer, the nonwoven fabric may be in the form of a single layer or 3 to about 25 sheets of nonwoven fabric may be stacked, for example. Different types of nonwoven fabric may be used in combination. If a part or the whole of the nonwoven fabric or webs is adhered in a subsequent step, the effect of the present invention can further be enhanced.

It is a feature of the invention of the present application to use a nonwoven fabric made of polyethylene fibers having a metal element content of less than 40 ppm as a spacer. The metal element content of less than 40 ppm leads to a sufficiently small amount of metal eluted from the filter and thus the required performance can be satisfied.

Generally, the spacer preferably has a low basis weight in order to increase the number of hills. Generally, however, since the strength of a nonwoven fabric decreases as its basis weight decreases, an increased effort in enhancing the strength of a nonwoven fabric is necessitated. As measures to enhancing the strength of a nonwoven fabric in order to reduce the basis weight, conjugated fibers can be used as the polyethylene fibers to constitute the spacer. As the conjugated fibers, from the viewpoint of fusing of thermal bonding fibers at their intersections, it is preferred to use fibers composed of composite components including a lower melting point resin and a higher melting point resin, namely, conjugated fibers composed of two or more components differing in melting point. The difference in melting point between two components is preferably 5° C. or more, more preferably 6° C. or more because control in thermo-adhesion processing is enabled. When conjugated fibers are used, the conjugated fibers are preferably conjugated fibers at least a part of the surface of which is continuously occupied by a lower melting point resin because molding by thermo-adhesion is easy and the shape of the fibers is not damaged significantly after adhesion at any point other than intersections, in other words, the same cross-sectional shape of the fibers is maintained.

The conjugation ratio (weight ratio) of the higher melting point resin and the lower melting point resin to constitute the conjugated fibers is preferably 70:30 to 30:70 in terms of adhesion strength and adhesiveness. Examples of the combination (lower melting point resin/higher melting point resin) to constitute the conjugated fibers include linear low density polyethylene/high density polyethylene, low density polyethylene/high density polyethylene, and a mixture of linear low density polyethylene and low density polyethylene/high density polyethylene. Examples of the type of conjugation include sheath-core type, eccentric sheath-core type, and parallel type.

As the conjugated fibers to constitute the spacer, a combined filament fibers composed of two or more components differing in melting point can be used. The combined filament fibers are fibers in which fibers made of the aforementioned higher melting point resin and fibers made of the lower melting point resin exist independently and are mixed. The combining ratio of the fibers made of the higher melting point resin to the fibers made of the lower melting point resin is the same as that of the aforementioned conjugated fibers and examples of the combination are also the same as those of the conjugated fibers.

As the polyethylene to be used as the material of the polyethylene nonwoven fabric that constitutes the spacer, a product containing a reduced amount of substances to be eluted from the polyethylene is utilized.

Although a smaller metal content is preferred for the purpose of the present invention, it is very difficult to render the metal content zero because a metal compound has generally been added as a lubricant or a catalyst neutralizer.

For this reason, "CREOLEX T701A" having an MFR of 12 g/10 min, a density of 0.966 g/cm$^3$, a melting point of 133° C., and a Vicat softening temperature of 127° C., which is a high density polyethylene (metallocene polyethylene) produced by Asahi Kasei Corporation and polymerized using a metallocene catalyst and "HARMOREX NJ744N" having an MFR of 12 g/10 min, a density of 0.911 g/cm$^3$, a melting point of 120° C., and a Vicat softening temperature of 90° C., which is a linear low density polyethylene (metallocene polyethylene) produced by Japan Polyethylene Corporation can preferably be utilized. Using such a polyethylene makes it possible to obtain polyethylene conjugated fibers having a metal element content of less than 40 ppm, namely, good polyethylene conjugated fibers from which metal elements or the like are eluted in an extremely reduced amount, which heretofore were unavailable. The production method and the characteristics of the polyethylene conjugated fibers and a nonwoven fabric using the same are described below. The content of metal elements in the polyethylene conjugated fibers is preferably less than 40 ppm, more preferably less than 30 ppm, and even more preferably less than 20 ppm.

In the aforementioned conjugated fibers, an additive may have been incorporated as far as the elution of metal from polyethylene, which is the effect of the present invention, is not inhibited. Examples of the additive include an antioxidant and a weatherproof agent.

Preferably, the nonwoven fabric made of polyethylene conjugated fibers to be used as the spacer of the pleated cartridge filter of the present invention is composed of one or a combination of two or more selected from the group consisting of entangled staple fibers, melt-blown nonwoven fabrics, and spunbond nonwoven fabrics. Any type of nonwoven fabric can be produced in accordance with a conventional method. Preferably, the spacer is formed of a single sheet or a plurality of sheets stacked of such nonwoven fabric. Although the number of sheets stacked may be chosen appropriately according to the thickness of the entangled staple fibers, melt-blown nonwoven fabric, or spunbond nonwoven fabric to be used, and the thickness of the desired assembly (filter material), the nonwoven fabric may be in the form of a single layer or a plurality of sheets may be stacked, for example.

As a specific example of the combination of the filtration membrane and the spacer, a laminate in which one spacer is stacked on each side of one PTFE membrane can be used as a filter material. In another aspect, a laminate in which one to six sheets of ultrahigh molecular weight polyethylene ultrafine fiber nonwoven fabric are stacked so that the total basis weight may be 10 to 100 g/m$^2$ is used as a filtration membrane and a polyethylene conjugated fiber nonwoven fabric is stacked on each side of the filtration membrane as a spacer can be used as a filter material.

In view of the fusibility to a polyethylene membrane and the cleanability, the members constituting the pleated cartridge filter of the present invention other than the filter material described above, namely, the cylindrical core, the caps, and the housing cage are preferably partially made of a polyethylene resin, and more preferably wholly made of a polyethylene resin. Examples of materials that can be used other than the polyethylene resin include fluororesin, etc. The pleated cartridge filter all the parts of which are constituted of a polyethylene resin, especially, a polyethylene resin having a reduced metal content (specifically, a metallocene polyethylene polymerized using a metallocene catalyst) can preferably be used as a pleated cartridge filter for high-purity chemical applications.

The pleated cartridge filter of the present invention is produced by a production method generally comprising the steps of:

(1) preparing a filtration membrane by production or purchase, (2) producing a nonwoven fabric made of polyethylene fibers, (3) combining the filtration membrane of (1) with the nonwoven fabric of (2) to form a laminate, (4) pleating the laminate, (5) winding the laminate pleated in the above step on a cylindrical core to join both the sides extending along the axial direction of the core on which the nonwoven fabric has been wound, thereby forming a circumferentially continuous filter material, and (6) attaching caps made of polyethylene to both ends.

(7) The filter material is inserted into a cage, if necessary, to form a pleated cartridge filter.

The cage is an outer wall material of a cylindrical filter and may also be called a housing cage, a filter cage, an outer cage, a sleeve, a protector, a skeleton, etc.

The aforementioned step (1): The production of a filtration membrane can be performed in accordance with a conventional method. When the filtration membrane is a polyethylene membrane, a nonwoven fabric can be produced by spinning a single fiber by, for example, a melt-blowing method using a single type of polyethylene as a raw material. If necessary, two or more sheets of melt-blown nonwoven fabric can be stacked.

The aforementioned step (2): The production of the nonwoven fabric formed of polyethylene fibers can be performed in accordance with a conventional method. Specifically, for example, a nonwoven fabric can be produced by spinning parallel type composite staple fibers using two thermoplastic resins as raw materials, entangling the fibers with a carding machine to produce webs, and then thermoadhering the webs.

The aforementioned step (3): The nonwoven fabrics are stacked to form a laminate.

The aforementioned step (4): The laminate is subjected to pleating. The pleating can be performed using a conventional method appropriately selected. If necessary, such treatment as cutting, molding, drying, and compaction, can be performed between the aforementioned steps.

The aforementioned step (5): The pleated laminate (filter material) obtained in (4) above is wound on a cylindrical core so that it may have a prescribed number of hills or a prescribed surface area and then both the sides of the filter material extending along the axial direction of the filter are joined to form a cylindrical filter material that is circumferentially continuous. As the method of the joining, a conventional method, such as heat sealing and bonding using ultrasonic welding, may be appropriately selected and used. As the cylindrical core, a conventional core can be used and, for example, a porous, cylindrical core made of polyethylene can be used.

The aforementioned step (6): Subsequently, caps are attached to both ends of the core on which the filter material is wound, thereby forming a cylindrical filter. The attachment of the caps can also be performed using a conventional method appropriately selected.

The aforementioned step (7): The filter material is inserted into a cage, if necessary, thereby forming a pleated cartridge filter.

EXAMPLES

The following examples are given by way of illustration only. The scope of the present invention is not limited to the examples.

The measuring method and the definition of the physical property values shown in the examples are as follows.

<Test of Measuring the Content of Metal Element>

From a washed filter cartridge was sampled 0.3 g of a spacer, and then nitric acid and hydrochloric acid were added thereto, followed by microwave decomposition. The resulting mixture was diluted with ultrapure water to 90 g, and then subjected to ICP-MS analysis and ICP-AES analysis.

<Vicat softening point>

Vicat softening point was measured in accordance with JIS K7206.

Example 1

A polyethylene having an MFR of 12 g/10 min (metallocene polyethylene, CREOLEX T701A, produced by Asahi Kasei Corporation, density: 0.966 g/cm$^3$, melting point: 133° C., Vicat softening temperature: 127° C.) and a polyethylene having an MFR of 12 g/10 min (metallocene polyethylene, HARMOREX NJ744N produced by Japan Polyethylene Corporation, density: 0.911 g/cm$^3$, melting point: 120° C., Vicat softening temperature: 90° C.) were extruded as a core component at 250° C. and as a sheath component at 230° C., respectively, through a spinneret having a sheath/core ratio of 50/50 and an aperture diameter of 0.8 mm and then wound at a spinning rate of 270 m/min, thereby obtaining an unstretched yarn having a fineness of 255 d/f (283.31 dtex/f). The unstretched yarn was stretched by 5.5 times, thereby adjusting the cut length to 64 mm. The resulting fibers had a fineness of 5.5 d/f ((6.11 dtex/f), a strength at break of 2.9 gf/D (2.56 cN/dtex), and an elongation at break of 97%. The number of crimps of the fibers was 13.5 hills/inch (5.31 hills/cm). The fibers were carded to obtain a web. The card processability was good. The card web prepared was subjected to air-through processing (125° C., conveyor speed: 8.5 m/min), followed by emboss processing at a temperature of 121° C., a line pressure of 20 kgf/cm, and a rate of 10.0 m/min with an emboss roll having a ratio of convex portions to surface area of 25%. The strength at break of the resulting nonwoven fabric was 6.8 kgf/5 cm in MD and 1.7 kgf/5 cm in CD.

A sheet prepared by stacking an ultrahigh molecular weight polyethylene membrane produced by TEIJIN LIMITED and having a pore diameter of 20 nm on the nonwoven fabric, then cutting to 240 mm width, and then pleating to the number of hills of 235 and a hill height of 10 mm was wound on a cylindrical porous core made of polyethylene, and then the opposing ends of the sheet were heat-sealed. Then, caps made of polyethylene by injection molding were adhered to both ends of the cylinder, thereby forming a pleated filter.

Then, the pleated filter was washed with 5% by weight hydrochloric acid and further washed with ultrapure water.

Example 2

Polyethylene fiber A: Metallocene polyethylene HARMOREX NJ744N produced by Japan Polyethylene Corporation (fineness: 16d/f (17.78 dtex/f), fiber length: 64 mm, density: 0.911 g/cm$^3$, melting point: 120° C., Vicat softening temperature: 90° C.)

Polyethylene fiber B: A polyethylene (metallocene polyethylene, CREOLEX T701A, produced by Asahi Kasei Corporation, density: 0.966 g/cm$^3$, melting point: 133° C.) was extruded from a spinneret having an aperture diameter of 0.8 mm at 250° C. and then was wound at a spinning rate of 677 m/min, thereby obtaining an unstretched yarn having a fineness of 10 d/f (11.11 dtex/f). Subsequently, the unstretched yarn was stretched at a stretching ratio of 5.0 times using a hot water stretching device filled with hot water at 90° C., and was provided with zigzag crimps using a push-in crimper. The crimped tow was dried at 90° C. and then cut, thereby obtaining polyethylene fibers B 51 mm in length.

A card web prepared by blending 20% by weight of the polyethylene fibers A and 80% by weight of the polyethylene fibers B was subjected to air-through processing (125° C., conveyor speed: 8.5 m/min), followed by emboss processing at a temperature of 121° C., a line pressure of 20 kgf/cm, and a rate of 10.0 m/min with a flat roll. The strength at break of the 50 g/m$^2$ nonwoven fabric was 3.3 kgf/5 cm in MD and 0.5 kgf/5 cm in CD. A sheet prepared by stacking the aforementioned nonwoven fabric as a spacer on each side of an ultrahigh molecular weight polyethylene membrane produced by TEIJIN LIMITED and having a pore diameter of 20 nm, then cutting to 240 mm width, and then pleating to the number of hills of 141 and a hill height of 10 mm was wound on a cylindrical porous core made of polyethylene, and then the opposing ends of the sheet were heat-sealed. Then, caps made of polyethylene by injection molding were adhered to both ends of the cylinder, thereby forming a pleated filter. Then, the pleated filter was washed with 5% by weight hydrochloric acid and further washed with ultrapure water.

Example 3

A polyethylene having an MFR of 12 g/10 min (metallocene polyethylene, CREOLEX T701A, produced by Asahi Kasei Corporation, density: 0.966 g/cm³, melting point: 133° C., Vicat softening temperature: 127° C.) and a polyethylene having an MFR of 12 g/10 min (metallocene polyethylene, HARMOREX NJ744N produced by Japan Polyethylene Corporation, density: 0.911 g/cm³, melting point: 120° C., Vicat softening temperature: 90° C.) were extruded as a core component at 250° C. and as a sheath component at 230° C., respectively, through a spinneret having a sheath/core ratio of 50/50 and an aperture diameter of 0.8 mm and then wound at a spinning rate of 677 m/min, thereby obtaining an unstretched yarn having a fineness of 10 d/f (11.11 dtex/f).

The unstretched yarn was stretched at a stretching ratio of 5.0 times using a hot water stretching device filled with hot water at 90° C., and then was provided with zigzag crimps using a push-in crimper. The crimped tow was dried at 90° C. and then cut, thereby obtaining fibers 51 mm in length. The resulting fibers had a fineness of 2.2 d/f (2.44 dtex/f), a strength at break of 2.8 gf/D (2.47 cN/dtex), and an elongation at break of 75%. The number of crimps of the fibers was 14.5 hills/inch (5.71 hills/cm). The fibers were carded to obtain a web. The card processability was good. The card web prepared was subjected to air-through processing (125° C., conveyor speed: 8.5 m/min), followed by emboss processing at a temperature of 121° C., a line pressure of 20 kgf/cm, and a rate of 10.0 m/min with an emboss roll having a ratio of convex portions to surface area of 4%. The strength at break of the resulting nonwoven fabric of 30 g/m³ was 5.3 kgf/5 cm in MD and 1.0 kgf/5 cm in CD. The nonwoven fabric was processed as spacers by the same method as in Example 1, thereby forming a pleated filter.

Example 4

A polyethylene having an MFR of 12 g/10 min (metallocene polyethylene, CREOLEX T701A, produced by Asahi Kasei Corporation, density: 0.966 g/cm³, melting point: 133° C., Vicat softening temperature: 127° C.) and a metallocene polyethylene having an MFR of 20 g/10 min (NIPOLON-L produced by Tosoh Corporation, density: 0.936 g/cm³, melting point: 124° C., Vicat softening temperature: 111° C.) were extruded as a core component at 250° C. and as a sheath component at 230° C., respectively, through a spinneret having a sheath/core ratio of 50/50 and an aperture diameter of 0.8 mm and then wound at a spinning rate of 677 m/min, thereby obtaining an unstretched yarn having a fineness of 10 d/f. The unstretched yarn was stretched at a stretching ratio of 4.0 times using a hot water stretching device filled with hot water at 90° C., and then was provided with zigzag crimps using a push-in crimper. The crimped tow was dried at 90° C. and then cut, thereby obtaining fibers 51 mm in length. The resulting fibers had a fineness of 2.8 d/f (3.11 dtex/f), a strength at break of 2.1 gf/D (1.85 cN/dtex), and an elongation at break of 70%. The number of hills of the fibers was 13.5 hills/inch (5.31 hills/cm). The fibers were carded to obtain a web. The card processability was good. The card web prepared using the fibers was subjected to air-through processing (125° C., conveyor speed: 8.5 m/min), followed by emboss processing at a temperature of 121° C., a line pressure of 20 kgf/5 cm, and a rate of 10.0 m/min with an emboss roll having a ratio of convex portions to surface area of 4%. The strength at break of the resulting nonwoven fabric of 30 g/m³ was 5.3 kgf/5 cm in MD and 1.0 kgf/cm in CD. The nonwoven fabric was processed as spacers by the same method as in Example 1, thereby forming a pleated filter.

Example 5

A sheet prepared by stacking a nonwoven fabric prepared by the same method as in Example 1 as a spacer on each side of a PTFE membrane SMO-23010 manufactured by JAPAN GORE-TEX INC. (pore diameter: 0.1 µm), then cutting to 240 mm width, and then pleating to the number of hills of 235 and a hill height of 10 mm was wound on a cylindrical porous core made of polyethylene, and then the opposing ends of the sheet were heat-sealed. Then, caps made of polypropylene produced by injection molding were adhered to both ends of the cylinder, thereby forming a pleated filter. Then, the pleated filter was washed with 5% by weight hydrochloric acid and further washed with ultrapure water.

Example 6

A sheet prepared by stacking a nonwoven fabric prepared by the same method as in Example 2 as a spacer on each side of a PTFE membrane SMO-23010 manufactured by JAPAN GORE-TEX INC. (pore diameter: 0.1 µm), then cutting to 240 mm width, and then pleating to the number of hills of 141 and a hill height of 10 mm was wound on a cylindrical porous core made of polyethylene, and then the opposing ends of the sheet were heat-sealed. Then, caps made of polyethylene produced by injection molding were adhered to both ends of the cylinder, thereby forming a pleated filter. Then, the pleated filter was washed with 5% by weight hydrochloric acid and further washed with ultrapure water.

Example 7

A sheet prepared by stacking a nonwoven fabric prepared by the same method as in Example 3 as a spacer on each side of a PTFE membrane SMO-23010 manufactured by JAPAN GORE-TEX INC. having a pore diameter of 0.1 µm, then cutting to 240 mm width, and then pleating to the number of hills of 235 and a hill height of 10 mm was wound on a cylindrical porous core made of polyethylene, and then the opposing ends of the sheet were heat-sealed. Then, caps made of polyethylene produced by injection molding were adhered to both ends of the cylinder, thereby form a pleated filter. Then, the pleated filter was washed with 5% by weight hydrochloric acid and further washed with ultrapure water.

Example 8

A pleated filter was prepared in the same manner as in Example 7 except using the nonwoven fabric obtained by the same method as in Example 4 as spacers.

Example 9

A pleated filter was prepared in the same manner as in Example 7 except using the nonwoven fabric obtained by the same method as in Example 1 as spacers.

Comparative Example 1

A pleated filter was prepared in the same manner as in Example 1 except using polyethylene nonwoven fabric "Tyvek 1442R" produced by E. I. du Pont de Nemours and Company as spacers.

Comparative Example 2

A pleated filter was prepared in the same manner as in Example 1 except using polyethylene net "Delnet RC0709-16H" produced by Del Star Technologies, Inc. as spacers.

TABLE 1

|  | Example 1 | Example 2 | Example 3 | Example 4 | Example 5 | Example 6 | Example 7 | Example 8 | Example 9 |
|---|---|---|---|---|---|---|---|---|---|
| Sheath component | LLDPE | — | LLDPE | LLDPE | LLDPE | — | LLDPE | LLDPE | LLDPE |
| MFR (g/10 min) | 12 | — | 12 | 20 | 12 | — | 12 | 20 | 12 |
| Density (g/cm$^3$) | 0.911 | — | 0.911 | 0.936 | 0.911 | — | 0.911 | 0.936 | 0.911 |
| Melting point (° C.) | 120 | — | 120 | 124 | 120 | — | 120 | 124 | 120 |
| Vicat softening temperature (° C.) | 90 | — | 90 | 111 | 90 | — | 90 | 111 | 90 |
| Core component | HDPE | HDPE | HDPE | HDPE | HDPE | HDPE | HDPE | HDPE | HDPE |
| MFR (g/10 min) | 12 | 12 | 12 | 12 | 12 | 12 | 12 | 12 | 12 |
| Density (g/cm$^3$) | 0.966 | 0.966 | 0.966 | 0.966 | 0.966 | 0.966 | 0.966 | 0.966 | 0.966 |
| Melting point (° C.) | 133 | 133 | 133 | 133 | 133 | 133 | 133 | 133 | 133 |
| Vicat softening temperature (° C.) | 127 | 127 | 127 | 127 | 127 | 127 | 127 | 127 | 127 |
| Metal element content (ppm) | 13 | 7 | 13 | 25 | 13 | 7 | 13 | 25 | 13 |
| Number of filter hills | 235 | 141 | 235 | 235 | 235 | 141 | 235 | 235 | 235 |
| Height of filter hills | 10 | 10 | 10 | 10 | 10 | 10 | 10 | 10 | 10 |
| Cap | PE | PE | PE | PE | PP | PE | PE | PE | PE |
| Filtration membrane | PE | PE | PE | PE | PTFE | PTFE | PTFE | PTFE | PTFE |

TABLE 2

|  | Comparative Example 1 | Comparative Example 2 |
|---|---|---|
| Sheath component | — | — |
| MFR (g/10 min) | — | — |
| Density (g/cm$^3$) | — | — |
| Melting point (° C.) | — | — |
| Vicat softening temperature (° C.) | — | — |
| Core component | HDPE | HDPE |
| MFR (g/10 min) | 12 | 12 |
| Density (g/cm$^3$) | 0.966 | 0.966 |
| Melting point (° C.) | 133 | 133 |
| Vicat softening temperature (° C.) | 127 | 127 |
| Metal element content (ppm) | 45 | 40 |
| Number of filter hills | 235 | 235 |
| Height of filter hills | 10 | 10 |
| Cap | PE | PE |
| Filtration membrane | PE | PE |

The pleated cartridge filter of the present invention can preferably be used for all filter applications because the amount of metal eluted from the polyethylene constituting the filter can be significantly reduced. It can suitably be used not only for applications of filtration of liquids in the fields of IC, etc. but also for applications of primary filtration of medical drags, etc.

EXPLANATION OF SYMBOLS

1 Pleated cartridge filter
2 Housing cage
3 Filter material
4 Cap
5 Core

The invention claimed is:

1. A cylindrical pleated cartridge filter comprising a cylindrical core, a pleated filter material wound on the core, and caps sealing both ends of the core, wherein the pleated filter material is composed of a filtration membrane and a spacer laminated together, and the spacer is a nonwoven fabric made of polyethylene fibers consisting of polyethylene and having a metal element content of 7 ppm or more and less than 40 ppm.

2. The pleated cartridge filter according to claim 1, wherein the core and the caps are made of polyethylene.

3. The pleated cartridge filter according to claim 1, wherein the filtration membrane is a PTFE membrane or an ultrahigh molecular weight polyethylene membrane.

4. The pleated cartridge filter according to claim 1, wherein the polyethylene fibers are conjugated fibers.

5. The pleated cartridge filter according to claim 1 housed in a cylindrical housing cage.

6. The pleated cartridge filter according to claim 1, wherein the polyethylene fibers are polyethylene fibers made of polyethylene polymerized using a metallocene catalyst.

7. The pleated cartridge filter according to claim 1, wherein the polyethylene fibers are conjugated fibers composed of two or more polyethylene components differing in melting point.

8. The pleated cartridge filter according to claim 1, wherein the polyethylene fibers are conjugated fibers, wherein the conjugated fibers are selected from the group consisting of a combination of linear low density polyethylene and high density polyethylene, a combination of low density polyethylene and high density polyethylene, and a combination of a mixture of linear low density polyethylene and low density polyethylene and high density polyethylene.

9. The pleated cartridge filter according to claim 1, wherein the nonwoven fabric made of polyethylene fibers is a nonwoven fabric made of conjugated fibers composed of two or more polyethylene components differing in melting point or a nonwoven fabric made of combined filament fibers composed of two or more polyethylene components differing in melting point.

* * * * *